(12) United States Patent
Maruyama

(10) Patent No.: US 12,163,551 B2
(45) Date of Patent: Dec. 10, 2024

(54) SUPPORT STRUCTURE

(71) Applicant: HITACHI ASTEMO, LTD., Hitachinaka (JP)

(72) Inventor: Yasuhiro Maruyama, Nagano (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 314 days.

(21) Appl. No.: 17/796,162

(22) PCT Filed: Nov. 16, 2020

(86) PCT No.: PCT/JP2020/042540
§ 371 (c)(1),
(2) Date: Jul. 28, 2022

(87) PCT Pub. No.: WO2021/199483
PCT Pub. Date: Oct. 7, 2021

(65) Prior Publication Data
US 2023/0340977 A1    Oct. 26, 2023

(30) Foreign Application Priority Data
Mar. 30, 2020  (JP) .................. 2020-059525

(51) Int. Cl.
*F16B 4/00*    (2006.01)
*B62D 7/18*    (2006.01)

(52) U.S. Cl.
CPC .............. *F16B 4/004* (2013.01); *B62D 7/18* (2013.01)

(58) Field of Classification Search
CPC ... F16B 4/004; F16B 4/00; B62D 7/18; B29C 65/64; B29C 66/612; B29C 66/742; B29C 66/8322
See application file for complete search history.

(56) References Cited

U.S. PATENT DOCUMENTS

2016/0238062 A1    8/2016  Bennett

FOREIGN PATENT DOCUMENTS

| JP | 2000-9111 | 1/2000 | |
| JP | 2010-139018 | 6/2010 | |
| JP | 2010139018 A | * 6/2010 | ............. B29C 65/64 |

OTHER PUBLICATIONS

International Search Report issued Dec. 8, 2020 in International Application No. PCT/JP2020/042540.

* cited by examiner

*Primary Examiner* — Lee A Holly
(74) *Attorney, Agent, or Firm* — Wenderoth, Lind & Ponack, L.L.P.

(57) ABSTRACT

A support structure including: a body (12) having a press-fitting hole (36); and a collar (34) that is press-fit into the press-fitting hole. The support structure is characterized in that: the collar includes a press-fitting part (34a) at an area that is press-fit into the press-fitting hole, a flange part (34c) provided to one end side of the press-fitting part, and a distally-tapered tapered part (34b) provided to the other end side of the press-fitting part. The press-fitting hole includes a press-fitted hole at an area into which the press-fitting part is press-fit, an intrusion hole at an area into which the tapered part intrudes, and a circumferential groove part provided between the press-fitted hole and the intrusion hole. When the axial-direction length of the press-fitting part is a, the axial-direction length of the press-fitted hole is b, and the axial-direction length of the circumferential groove part is c, b<a<b+c.

8 Claims, 3 Drawing Sheets

SUPPORT STRUCTURE

TECHNICAL FIELD

The present invention relates to a support structure having a structure in which a collar into which a shaft body is inserted is press-fitted into a press-fitting hole of a body.

BACKGROUND ART

Various arms such as a tie rod and a lower arm are connected to a vehicle support structure (steering knuckle which is, hereinafter, simply referred to as a knuckle) via bolts (fastening members). In order to reduce weight, a cast product of an aluminum alloy is used as the knuckle. These knuckles and various arms such as tie rods are fastened by fastening members such as bolts made of steel. A collar is press-fitted since the knuckle made of an aluminum alloy has a low proof stress, and in order to reduce a surface pressure, a collar made of steel is press-fitted into an attachment hole (press-fitting hole: through hole) of a tie rod or the like in the knuckle, and a bolt is inserted into the collar to bolt and attach various arms such as the tie rod.

In order to obtain a tightening allowance, an attachment hole diameter of the knuckle is formed to be a hole diameter smaller than an outer diameter of the collar, and the collar having the large diameter is press-fitted into the attachment hole. Therefore, burrs of the aluminum alloy may be generated on an inner wall of the attachment hole, and the burrs may be scattered to adversely affect various portions.

PTL 1 (JP-A-2010-139018) discloses a resin product with a press-fitting member.

The resin product in the resin product with the press-fitting member includes a press-fitting hole (through hole) composed of a large-diameter part and a small-diameter part, and a plurality of peaks extending in parallel in an axial direction are formed on an inner wall of the large-diameter part.

On the other hand, the press-fitting member includes a large-diameter press-fitting part and a guide part having a smaller diameter than the press-fitting part.

The press-fitting member is configured such that the large-diameter press-fitting part is press-fitted into the press-fitting hole of the resin product so as to crush the peaks, and burrs generated when the peaks are crushed are accumulated in a gap between the peaks, and a space in a stepped part (a right-angled wall) between the large-diameter part and the small-diameter part of the press-fitting hole.

CITATION LIST

Patent Literature

PTL 1: JP-A-2010-139018

SUMMARY OF INVENTION

Technical Problem

According to the resin product with the press-fitting member described in PTL 1, burrs generated when the press-fitting member is press-fitted are confined in gaps generated in the resin product, and thus a deburring step is unnecessary.

However, in the resin product with the press-fitting member of the PTL 1, a plurality of peaks extending in the axial direction are provided on an inner wall of the large-diameter press-fitted part, and the press-fitting member is press-fitted so as to crush the peaks, and thus there is a problem that the tightening allowance is reduced and a fastening force is weakened accordingly.

In addition, it is not easy to form a plurality of peaks on the inner wall of the large-diameter press-fitted part, which is the press-fitting hole including the large-diameter part and the small-diameter part, and the process of forming the peaks on the inner wall of the press-fitting hole tends to be complicated.

Solution to Problem

The present embodiment has been made to solve the above problem, and an object of the present embodiment is to provide a support structure that effectively prevents scattering of burrs and is easy to manufacture.

A support structure according to the present embodiment, including: a body including a press-fitting hole; and a collar to be press-fitted into the press-fitting hole of the body, in which the collar includes a press-fitting part as a portion to be press-fitted into the press-fitting hole, a flange part provided on one end side of the press-fitting part, and a distally-tapered tapered part provided on the other end side of the press-fitting part, the press-fitting hole of the body includes a press-fitted hole as a portion into which the press-fitting part is to be press-fitted, an intrusion hole as a portion into which the tapered part is to intrude, and a circumferential groove part provided between the press-fitted hole and the intrusion hole, and when an axial-direction length of the press-fitting part is defined as a, an axial-direction length of the press-fitted hole is defined as b, and an axial-direction length of the circumferential groove part is defined as c, $b<a<b+c$ is satisfied.

An inner circumferential edge part of the intrusion hole on a circumferential groove part side is brought close to an outer circumferential surface of the tapered part and is not in contact with the outer circumferential surface of the tapered part.

$c<b$ is preferably satisfied.

When an axial-direction length of the tapered part is defined as d, and a total length of the press-fitting hole in the axial direction is defined as e, $a+d<e$ is satisfied.

A diameter of the press-fitted hole is larger than a diameter of the intrusion hole.

The body and the collar are made of metal, and a hardness of the collar is larger than a hardness of the body.

The body is formed by gravity casting.

The circumferential groove part is formed in a manner of expanding or curving from an end portion of the press-fitted hole toward the inner circumferential edge part of the intrusion hole.

Advantageous Effect

According to claim 1, lengths of the respective parts are set such that, when an axial-direction length of the press-fitting portion is defined as a, an axial-direction length of the press-fitted hole is defined as b, and an axial-direction length of the circumferential groove part is defined as c, $b<a<b+c$ is satisfied, so that a corner part of the press-fitting part is positioned in the circumferential groove part when the collar is press-fitted into the press-fitting hole. Therefore, the generated burrs are also positioned in the circumferential groove part, and the falling and scattering of the burrs are prevented.

The circumferential groove part can be easily formed by cutting an inner wall of the press-fitting hole.

According to claim 2, the tapered part of the collar intrudes the small-diameter intrusion hole, and at this time, an inner circumferential edge part of the intrusion hole on a circumferential groove part side (the corner part on the circumferential groove part side) is brought close to an outer circumferential surface of the tapered part and is not in contact with the outer circumferential surface. As a result, the circumferential groove part is closed by the tapered part, and burrs are confined in the circumferential groove part and are prevented from falling and scattering.

DESCRIPTION OF EMBODIMENTS

Hereinafter, an embodiment of the invention will be described in detail.

Figure 1:
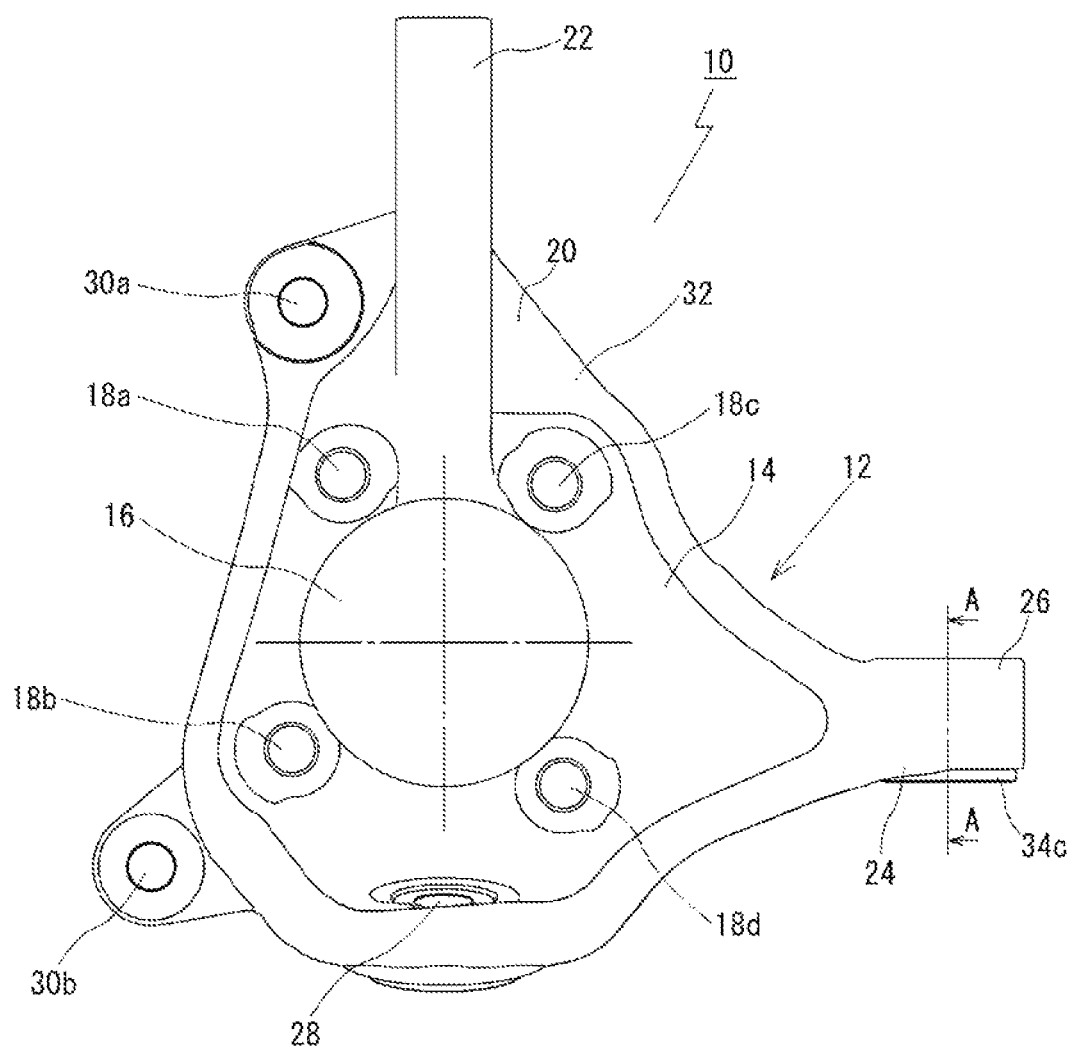
FIG. 1 is a front view of a support structure according to the present embodiment.
Figure 2:
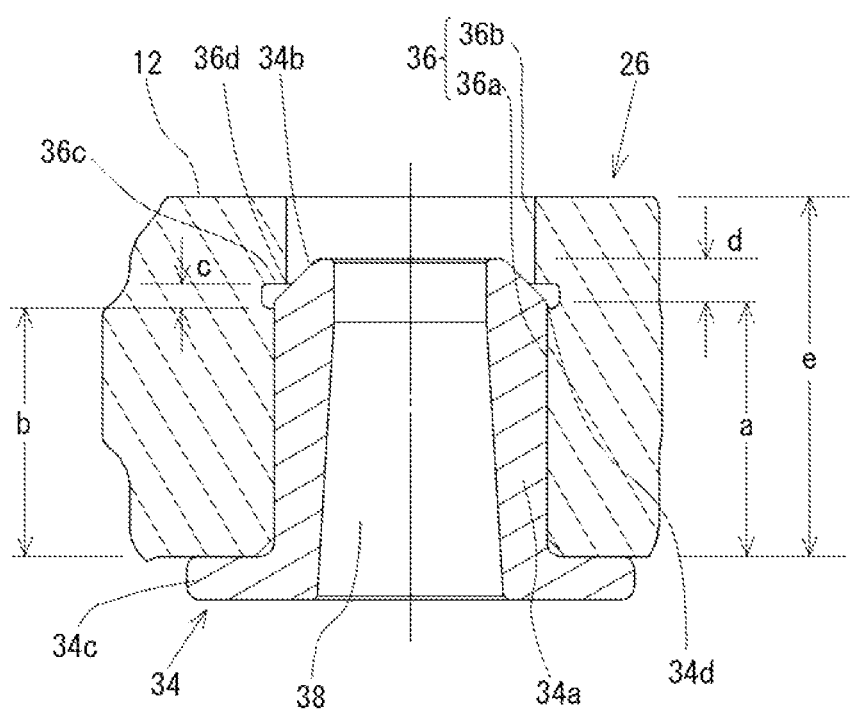
FIG. 2 is a cross-sectional view taken along a line A-A of FIG. 1.

FIG. 1 is a front view of a support structure 10 according to the present embodiment, and FIG. 2 is a cross-sectional view taken along a line A-A of FIG. 1.

The support structure 10 shown in FIG. 1 is a steering knuckle (hereinafter, simply referred to as a knuckle) for a vehicle, which is an example of a support structure.

Hereinafter, a knuckle will be described as an example.

The knuckle 10 is made of an aluminum alloy and is mainly cast by a gravity casting method.

FIG. 1 shows the knuckle 10 for a wheel of a right front wheel. A knuckle for a left front wheel is bilaterally symmetrical to the knuckle 10 shown in FIG. 1.

Since a basic structure and a function of the knuckle 10 are known, the structure and the function will be briefly described below.

The knuckle 10 includes a recessed part 14 with a bottom portion as a wheel attachment portion side at a center portion of a body 12. A center of a bottom surface of the recessed part 14 is provided with an axle hole 16 into which an axle of the wheel is rotatably fitted. The bottom portion of the recessed part 14 around the axle hole 16 is provided with four bolt holes 18a, 18b, 18c, 18d to which bolts of a wheel hub (not shown) serving as a wheel support body are screwed and joined.

A circumferential edge portion of the body 12 is provided with a plurality of support arms to which various members are connected.

A distal end portion of a support arm 20 extending above the body 12 is provided with a damper attachment part 22 to which a damper (not shown) of a suspension is connected.

A distal end portion of a support arm 24 of the body 12 that extends to either side in a front-rear direction of a vehicle (a rear side of the vehicle in FIG. 1) is provided with a tie rod attachment part 26 to which a tie rod (not shown) for transmitting a steering force from a steering wheel (not shown) is connected.

A lower portion of the body 12 is provided with a lower arm attachment portion 28 to which a lower arm (not shown), which is a control arm of the suspension, is connected.

Attachment holes 30a, 30b for attaching a brake caliper (not shown) are formed in a side surface portion of the body 12 opposite to the tie rod attachment part 26.

A rib 32 is formed so as to surround the recessed part 14 and to connect the support arm 22 and the support arm 24, thereby compensating for the strength of the body 12 made of the aluminum alloy.

FIG. 2 is a cross-sectional view of the tie rod attachment part 26 to which a tie rod (not shown) is connected.

The tie rod attachment part 26 includes a press-fitting hole (through hole) 36 into which a collar 34 is press-fitted. The press-fitting hole 36 includes a large-diameter press-fitted hole 36a into which a press-fitting part 34a of the collar 34 is press-fitted, and a small-diameter intrusion hole 36b into which a tapered part 34b of the collar 34 intrudes.

A circumferential groove part 36c is formed in an inner wall of the press-fitting hole 36 between the large-diameter press-fitted hole 36a and the small-diameter intrusion hole 36b.

The collar 34 is made of steel whose hardness is larger than the hardness of a body 20, and as described above, the collar 34 includes the tubular press-fitting part 34a, the distally-tapered tapered part 34b formed on one end side of the press-fitting part 34a, and a flange part 34c formed on the other end side of the press-fitting part 34a.

The collar 34 includes an insertion hole 38 through which a bolt (not shown) for attaching a tie rod (not shown) to the tie rod attachment part 26 is inserted.

In the present embodiment, lengths of respective parts are set such that, when an axial-direction length of the press-fitting part 34a is defined as a, an axial-direction length of the press-fitted hole 36a is defined as b, and an axial-direction length of the circumferential groove part 36c is defined as c, b<a<b+c is satisfied.

By setting the lengths of the respective parts in this manner, a distal corner part (corner part with the tapered part 34b) 34d of the press-fitting part 34a of the collar is positioned in the circumferential groove part 36c as shown in FIG. 2.

An outer diameter of the press-fitting part 34a of the collar 34 is formed to be slightly larger than an inner diameter of the press-fitted hole 36a of the press-fitting hole 36 so that a required fastening force is obtained in the collar 34 when the collar 34 is press-fitted into the press-fitting hole 36.

Therefore, when the collar 34 is press-fitted into the press-fitting hole 36, an aluminum burr (not shown) is generated in the vicinity of the distal corner part 34d of the press-fitting part 34a of the collar 34.

By setting the lengths of the respective parts as described above, the distal corner part 34d of the press-fitting part 34a is positioned in the circumferential groove part 36c as described above when the collar 34 is press-fitted into the press-fitting hole 36. Therefore, the generated burrs are also positioned in the circumferential groove part 36c, and the burrs are prevented from falling and scattering.

The tapered part 34b of the collar 34 intrudes the small-diameter intrusion hole 36b, and at this time, a corner part 36d, which is an inner circumferential edge part of the intrusion hole 36b on the circumferential groove part 36c side, is brought close to an outer circumferential surface of the tapered part 34b and is not in contact with the outer circumferential surface. As a result, the circumferential groove part 36c is closed by the tapered part 34b, and burrs are confined in the circumferential groove part 36c and are prevented from falling and scattering.

The reason why the corner part 36d is not in contact with the outer circumferential surface of the tapered part 34b is that, when the collar 34 is reliably press-fitted and the tie rod is attached to the tie rod attachment part 26, a bolt (not shown) is inserted into the insertion hole 38 of the collar 34, and a head portion of the bolt abuts against the flange part 34c and is further fastened by a nut (not shown), and at this time, the fastening is completely performed. When the corner part 36d abuts against the outer circumferential surface of the tapered part 34b, fastening by the bolt and nut may be insufficient.

In the press-fitting hole 36, the length b of the press-fitted hole 36a is preferably larger than the length c of the circumferential groove part 36c (c<b). The larger the length of the press-fitted hole 36a is, the larger the fastening force with respect to the collar 34 is. The circumferential groove part 36c may have a length sufficient to confine the burrs.

Figure 3:
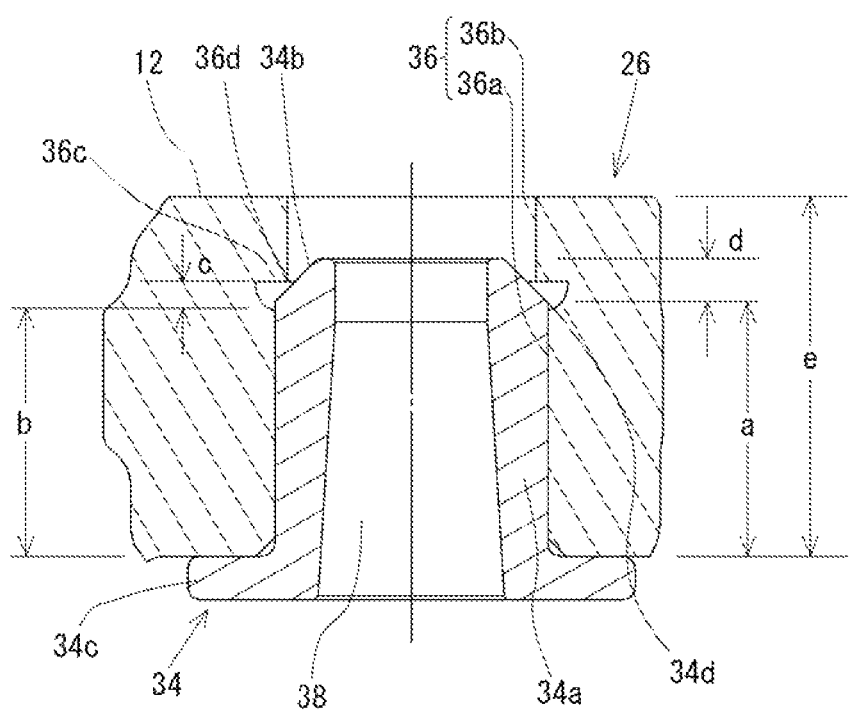
FIG. 3 is a view corresponding to the cross-sectional view taken along the line A-A of FIG. 1 in a mode different from the present embodiment.

The circumferential groove part 36c may not have a U-shaped cross section as in the present embodiment, and as shown in FIG. 3, a bottom surface of the circumferential groove part 36c may be recessed in a curved shape. Alternatively, in some cases, a diameter of the circumferential groove part 36c may be increased from an end portion of the press-fitted hole 36a having a large diameter toward an end portion of the small-diameter intrusion hole 36b.

A shape of the circumferential groove part 36c is not limited to the respective embodiments of the invention.

A sum of the length a of the press-fitting part 34a of the collar 34 and a length d of the tapered part 34b needs to be smaller than a total length e of the press-fitting hole 36 (a+d<e) so that a distal end of the tapered part 34b of the collar 34 does not protrude from the press-fitting hole 36.

In the present embodiment, the circumferential groove part 36c is provided, in which the burrs generated during the press-fitting of the collar 34 are confined. The circumferential groove part 36c is easily formed by cutting the inner wall of the press-fitting hole 36 after casting the body 12 of the knuckle.

Although the press-fitted hole 36a has a larger diameter than the intrusion hole 36b in the above embodiment, the press-fitted hole 36a may have the same diameter as the intrusion hole 36b. In short, it is sufficient if the burrs can be held in the circumferential groove part 36c.

Although the vehicle support structure (steering knuckle) has been described as an example of the support structure in the above embodiment, the support structure is not limited to the knuckle.

What is claimed is:

1. A support structure, comprising:
a body including a press-fitting hole; and
a collar to be press-fitted into the press-fitting hole of the body, wherein
the collar includes a press-fitting part as a portion to be press-fitted into the press-fitting hole, a flange part provided on one end side of the press-fitting part, and a distally-tapered tapered part provided on the other end side of the press-fitting part,
the press-fitting hole of the body includes a press-fitted hole as a portion into which the press-fitting part is to be press-fitted, an intrusion hole as a portion into which the tapered part is to intrude, and a circumferential groove part provided between the press-fitted hole and the intrusion hole, and
when an axial-direction length of the press-fitting part is defined as a, an axial-direction length of the press-fitted hole is defined as b, and an axial-direction length of the circumferential groove part is defined as c,
b<a<b+c is satisfied.

2. The support structure according to claim 1, wherein an inner circumferential edge part of the intrusion hole on a circumferential groove part side is brought close to an outer circumferential surface of the tapered part and is not in contact with the outer circumferential surface of the tapered part.

3. The support structure according to claim 1, wherein c<b is satisfied.

4. The support structure according to claim 1, wherein when an axial-direction length of the tapered part is defined as d, and a total length of the press-fitting hole in the axial direction is defined as e,
a+d<e is satisfied.

5. The support structure according to claim 1, wherein a diameter of the press-fitted hole is larger than a diameter of the intrusion hole.

6. The support structure according to claim 1, wherein the body and the collar are made of metal, and a hardness of the collar is larger than a hardness of the body.

7. The support structure according to claim 1, wherein the body is formed by gravity casting.

8. The support structure according to claim 1, wherein the circumferential groove part is formed in a manner of expanding or curving from an end portion of the press-fitted hole toward the inner circumferential edge part of the intrusion hole.

* * * * *